Dec. 30, 1941.  M. M. SLOTNICK  2,268,130
METHOD OF GEOPHYSICAL INVESTIGATION
Filed Feb. 8, 1940

Morris M. Slotnick INVENTOR.
BY P. L. Young ATTORNEY.

Patented Dec. 30, 1941

2,268,130

UNITED STATES PATENT OFFICE 2,268,130

METHOD OF GEOPHYSICAL INVESTIGATION

Morris M. Slotnick, Houston, Tex., assignor to Standard Oil Development Company, a corporation of Delaware Application February 8, 1940, Serial No. 317,857

1 Claim. (Cl. 181—0.5)

This invention relates to improvements in seismic methods for geophysical investigation.

It is customary in seismic prospecting for oil or other minerals to establish two sets of locations on a prospect. One set is called the shot points. At the shot points an elastic disturbance is created, usually by setting off some explosive substance. The other set of locations is called the set of detector locations. The detector location is a place at which an instrument known as a detector is placed to measure the magnitude of the shaking of the earth.

It is an object of the present invention to provide an arrangement of shot points and detectors, whereby a subsurface anomaly may be outlined.

More specifically, it is an object of the present invention to provide a method for outlining a subterranean structure, the presence of which has been known before the exploration method of the present invention is applied thereto.

Figure 1:
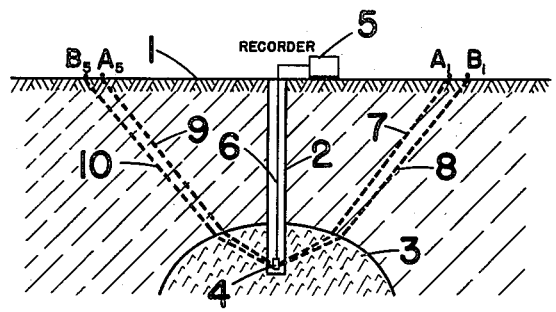
Figures 2, 3:
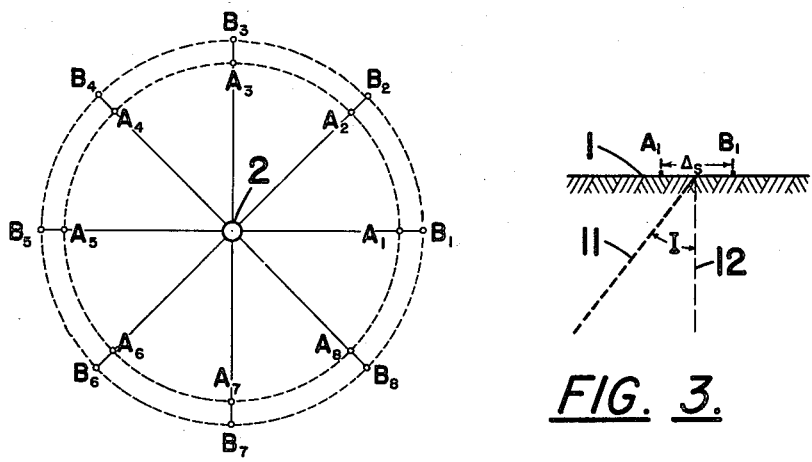

Other objects and advantages of the present invention may be seen from a reading of the following description in conjunction with the accompanying drawing in which Fig. 1 is a vertical sectional view through the earth showing a preferred arrangement of apparatus for carrying out the invention;

Fig. 2 is a top plan view showing the arrangement of shot point and detector illustrated in Fig. 1; and Fig. 3 is a vertical sectional view through the earth showing the application of the present invention to determine the angle of emergence of waves travelling through the earth.

It will be understood that before carrying out the herein described procedure the velocity of travel of seismic waves produced by explosives, both in the structure to be outlined and in the formations above the structure, must be known. The determination of the velocity of travel of seismic waves is conventional to the art and, for that reason, will not be further described.

Referring specifically to the drawing, from the surface of the earth 1 a bore hole 2 is drilled down until it penetrates into a subsurface anomaly 3, the presence of which has been previously known. In the drawing, a salt dome is depicted as being the subsurface anomaly for convenience in illustrating the invention, but other anomalies, for example anticlines, serpentine plugs, dikes or faults may be investigated in the same manner.

It is well known to the art that in the Gulf Coast region of the United States deposits of oil often occur at the flanks of salt domes and other domelike structures, and it is therefore highly desirable to be able to outline such subterranean structures.

In carrying out the present invention, a detector 4 is lowered into the bore hole so that it is substantially below the upper boundary of the anomaly which it is desired to outline. This detector may be any of the detectors conventional to the art and is attached to a suitable recorder 5 placed at the surface of the earth by means of an insulated cable 6. In the drawing, salt dome 3 is shown as being symmetrical and with bore hole 2 penetrating its center, but this is not necessary for carrying out the invention. In order to outline the formation, it is only necessary that the detector be placed within the formation. Bore hole 4 may therefore be drilled anywhere over the formation, the only requisite being that it penetrate the formation to permit a detector to be positioned therein.

A series of shot points $A_1$ to $A_8$ are arranged in a circular pattern which has as its center the axis of the bore hole into which the detector is lowered. A second series of shot points $B_1$ to $B_8$ are arranged in a circular pattern which is concentric with the first group of shot points. The shot points are so arranged that a line connecting a shot point in one pattern with an adjacent shot point in the other pattern will, if extended, intersect the axis of bore hole 2. For example, a line which passes through shot points $A_1$ and $B_1$ will, when extended, intersect the axis of bore hole 2 and, in like manner, the remaining shot holes are paired so that two of them fall on a line which, when extended, will intersect the axis of bore hole 2.

In carrying out the invention, explosive charges are detonated at the shot points as is conventional to the art and the times taken for elastic waves to travel from the position of the shot points to the detector are recorded. In Fig. 1 the paths of the seismic waves to detector 4 from points $A_1$, $B_1$, $A_5$ and $B_5$ are shown as dotted lines 7, 8, 9 and 10.

Since the distance from $A_1$ to detector 4 is less than the distance from $B_1$ to detector 4, it will take a greater length of time for the elastic wave to travel to detector 4 from $B_1$ than it does from $A_1$. This difference in time of travel may be utilized to determine the angle of emergence of the path of travel of explosive waves from the circles of the earth in the following manner.

The angle of the path of a seismic wave with the vertical at the surface of the earth is known as the angle of emergence and may be designated by symbol I. In Fig. 3 shot points $A_1$ and $B_1$ are shown, and the mean path taken by seismic waves from these shot points to the detector (not shown in this figure) is designated by numeral 11. The angle line 11 makes with a perpendicular 12 at the surface of the earth is I, the angle of emergence. If $\Delta S$ = the distance separating points $A_1$ from $B_1$,
$\Delta T$ = the difference in time of travel of seismic waves from points $A_1$ and $B_1$ to detector 4, and
$V$ = the velocity of seismic waves through the upper sedimentary formations, then $$\sin I = \frac{V \cdot \Delta T}{\Delta S}$$

As stated above, methods of determining velocities of seismic waves through geologic formations are well known to the art. The position of the detector in the bore hole is accurately known, the angle of emergence may be calculated as described above, and since the velocity of the seismic waves in the lower formations may be found by conventional methods, the path of the waves from the point of explosion to the detector may be accurately determined.

As a specific example of the application of the present invention the outline of a known salt dome was determined as follows: A bore hole was drilled through a point selected to penetrate through the highest point of a salt dome. This point was approximately 1300 feet below the surface of the earth, and the bore hole was carried down to a depth of 2600 feet or approximately 1300 feet in the salt dome. A circle of shot points having a radius of 5500 feet was then laid out on the surface of the earth with the bore hole as the center of the circle. A second circle of shot points concentric with the first and having a radius of 6000 feet was then laid out. The shot points in the two circles were paired so that the two points in each pair were separated by a distance of 500 feet. A detector was then lowered to the bottom of the bore hole and an explosive charge was fired at each selected shot point and the time of travel of a wave at the detector noted. Since the velocity of the seismic waves through the upper sedimentary rocks and through the salt dome was already known, the contour of the salt dome was obtained by applying the above mentioned calculations to the data obtained.

While I have disclosed as a specific example the application of this method to salt domes, such as occur on the Gulf Coast, it will be obvious that it may be applied to other geologic structures and that the depth of the bore hole used to penetrate the formation and the distance of the shot points from the bore hole and from each other may be regulated to conform with the geological structure under investigation. For example, if an anticline is being investigated, it will be more practical to arrange the shot points in other suitable subcircular arrangements. Moreover, while in the example given a detector was placed within the structure and a plurality of shot points were located at the surface of the earth, the position of shot points and detector may be interchanged. That is to say, a plurality of detectors may be arranged at the surface of the earth and a shot point may be arranged at a point within the formation to be outlined. Then, too, the invention is not limited to the number of shot points and the single detector shown. If desired, a plurality of detectors or shot holes, according to the arrangement, may be placed within the bore hole, and more than two detectors or shot points, according to the arrangement, may be placed on each radial line.

It has been mentioned before that the shape of the pattern of points located on the surface of the earth may be varied somewhat. These patterns should form closed curves, and there should be at least two concentric patterns with the points of the patterns paired so that a line extending from one point to the axis of the bore hole containing the subsurface point will include a point on the other curve.

The present invention may therefore be broadly stated to reside in determining the time of travel of seismic waves from a plurality of points at the surface of the earth to a point within a geological formation, the plurality of points at the surface of the earth being paired so that a line at the surface of the earth passing through a pair of the points will intersect a vertical line passing through the point within the geological formation.

It is therefore not my intention to be limited to the specific example shown or any of the specific applications mentioned, but to claim my invention as broadly as the prior art permits.

I claim:

A method of outlining a subsurface structure comprising the steps of penetrating said structure with a bore hole, arranging a detector of seismic waves in said bore hole at a known point within said structure, initiating seismic waves at points on the surface of the earth with a plurality of said points arranged on each of two concentrically closed curves and points on one curve paired with points on the other so that lines passing through said pairs of points will, when extended, intersect the axis of said bore hole, receiving with said detector waves initiated at each of said surface points and determining the travel time thereof between the points of initiation and the detector, whereby the paths of the waves between each of said surface points and the detector may be determined and the subsurface structure outlined.

MORRIS M. SLOTNICK.